US008392736B2

(12) United States Patent
Vaden

(10) Patent No.: US 8,392,736 B2
(45) Date of Patent: Mar. 5, 2013

(54) MANAGING MEMORY POWER USAGE

(75) Inventor: Thomas L. Vaden, Neshanic Station, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 12/533,849

(22) Filed: Jul. 31, 2009

(65) Prior Publication Data

US 2011/0029797 A1 Feb. 3, 2011

(51) Int. Cl.
*G06F 1/00* (2006.01)

(52) U.S. Cl. ........ 713/324; 713/300; 713/320; 711/100; 711/105; 711/170; 711/171; 711/172

(58) Field of Classification Search .............. 713/300, 713/320, 324; 711/100, 105, 170, 171, 172
See application file for complete search history.

(56) References Cited

U.S. PATENT DOCUMENTS

| | | | | |
|---|---|---|---|---|
| 5,524,248 | A * | 6/1996 | Parks et al. | 713/324 |
| 7,010,656 | B2 * | 3/2006 | Gupta | 711/165 |
| 7,216,197 | B2 * | 5/2007 | Verdun et al. | 711/105 |
| 7,237,133 | B2 * | 6/2007 | Aoki | 713/324 |
| 7,272,734 | B2 * | 9/2007 | Gooding | 713/320 |
| 7,549,034 | B2 * | 6/2009 | Foster et al. | 711/170 |
| 7,788,513 | B2 * | 8/2010 | Vaden et al. | 713/320 |
| 2003/0028711 | A1 * | 2/2003 | Woo et al. | 711/106 |
| 2007/0006000 | A1 * | 1/2007 | Jain et al. | 713/300 |
| 2007/0113015 | A1 | 5/2007 | Moll et al. | |
| 2008/0005516 | A1 * | 1/2008 | Meinschein et al. | 711/165 |
| 2008/0313482 | A1 * | 12/2008 | Karlapalem et al. | 713/324 |
| 2009/0083561 | A1 | 3/2009 | Kaburlasos et al. | |
| 2009/0125730 | A1 * | 5/2009 | Pagan | 713/300 |
| 2009/0132764 | A1 | 5/2009 | Moll et al. | |
| 2010/0122031 | A1 * | 5/2010 | Strumpen et al. | 711/122 |
| 2010/0138677 | A1 * | 6/2010 | Pagan et al. | 713/320 |
| 2010/0235662 | A1 * | 9/2010 | Nishtala | 713/322 |

OTHER PUBLICATIONS

Hewlett-Packard Development Company, L.P., "Configuring and Migrating Memory on vPars", A Technical White Paper, Mar. 2007, pp. 1-28.

* cited by examiner

*Primary Examiner* — Thomas Lee
*Assistant Examiner* — Jaweed A Abbaszadeh

(57) ABSTRACT

Methods of method of managing memory power usage in a computing device having two or more memory modules. By monitoring a system working set size of the computing device, a determination can be made if all active memory modules are needed for the system working set size. If not all active memory modules are needed for the system working set size, one or more of the active memory modules can be selected for power down. By evacuating data from the selected one or more memory modules, placing the evacuated one or more memory modules in a power-down state, and removing the powered-down memory modules from the active memory of the computing device, memory power usage can be reduced.

21 Claims, 5 Drawing Sheets

MANAGING MEMORY POWER USAGE

BACKGROUND

Computing devices, e.g., laptop computers, desktop computers, servers and the like, are utilizing increasing amounts of dynamic, i.e., volatile, memory to handle the variety, quantity and complexity of demands made by system and user applications. Such volatile system memory, e.g., dynamic random access memory (DRAM), provides much quicker access times than many other storage options, such as hard drives, optical drives, flash memory, etc. However, volatile system memory requires periodic refreshing to maintain its data, which can lead to significant energy demands on the computing device.

For the reasons stated above, and for other reasons that will become apparent to those skilled in the art upon reading and understanding the present specification, there is a need in the art for alternative methods and apparatus for reducing energy usage.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, electrical or mechanical changes may be made without departing from the scope of the present disclosure. The following detailed description is, therefore, not to be taken in a limiting sense, and the scope of the present disclosure is defined by the appended claims and equivalents thereof.

The various embodiments include methods of reducing power usage of system memory in a computer system. System memory is commonly provided by an arrangement of physical memory space, e.g., its volatile memory, and backing store, e.g., storage space allocated on a hard drive. By monitoring the size of the working set used by active processes, a measure of memory demand can be obtained. If the working set could be contained on less than all of the physical memory space of the system, some volatile memory modules could be powered down or off, thereby resulting in a reduction in power demand of the system. Because most computer systems augment their physical memory space with backing store (i.e., storage of data outside the physical memory space of its volatile memory, such as on a hard drive), the computer system would continue to be functional even if one or more of its memory modules were made unavailable. However, because volatile memory has faster access times than hard drives and other non-volatile memory options, various embodiments further provide for restoring powered-down volatile memory modules if the rate of page faults, i.e., accesses to virtual addresses not contained in the physical address space, exceeds some threshold.

Figure 1:
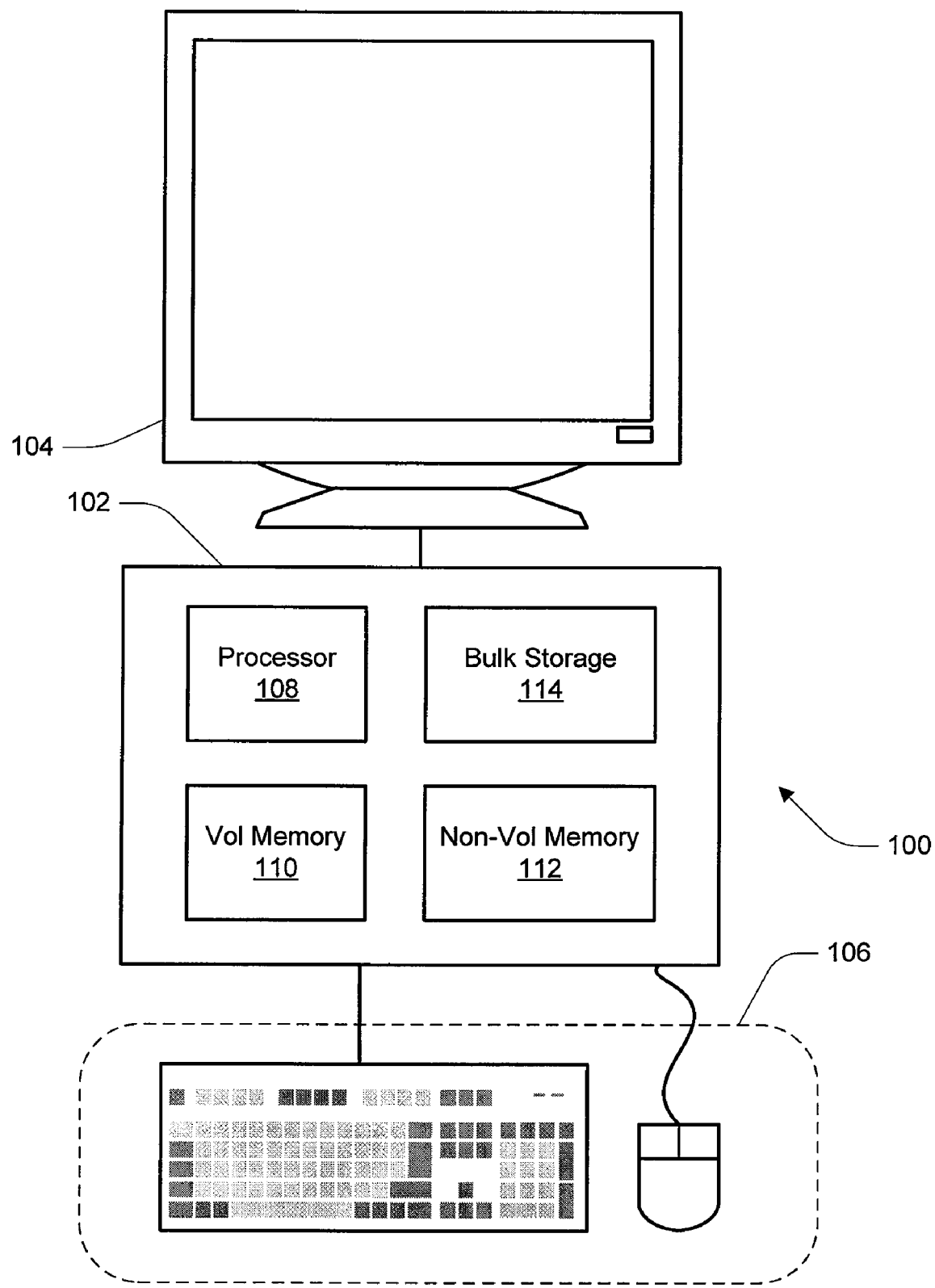
FIG. 1 is a representation of a computer system for use with various embodiments of the disclosure.

FIG. 1 shows an exemplary computer system 100 suitable for suitable for use with embodiments of the disclosure. The computer system 100 includes a computing device 102, one or more output devices 104 and one or more user input devices 106.

The computing device 102 may represent a variety of computing devices, such as a network server, a personal computer or the like. The computing device 102 may further take a variety of forms, such as a desktop device, a blade device, a portable device or the like. Although depicted as a display, the output devices 104 may represent a variety of devices for providing audio and/or visual feedback to a user, such as a graphics display, a text display, a touch screen, a speaker or headset, a printer or the like. Although depicted as a keyboard and mouse, the user input devices 106 may represent a variety of devices for providing input to the computing device 102 from a user, such as a keyboard, a pointing device, selectable controls on a user control panel, or the like.

Computing device 102 typically includes one or more processors 108 that process various instructions to control the operation of computing device 102 and communicate with other electronic and computing devices. Computing device 102 may be implemented with one or more memory components, examples of which include a volatile memory 110, such as random access memory (RAM), dynamic RAM (DRAM), synchronous DRAM (SDRAM) and the like; non-volatile memory 112, such as read-only memory (ROM), flash memory or the like; and/or a bulk storage device 114. Common examples of bulk storage devices include any type of magnetic, optical or solid-state storage device, such as a hard disc drive, a solid-state drive, a magnetic tape, a recordable/rewriteable optical disc, and the like. The one or more memory components may be fixed to the computing device 102 or removable.

The one or more memory components are computer usable storage media to provide data storage mechanisms to store various information and/or data for and during operation of the computing device 102, and to store machine-readable instructions adapted to cause the processor 108 to perform some function. A basic input/output system (BIOS), an operating system and one or more application programs may be stored in the one or more memory components for execution by the processor 108. Storage of the BIOS is typically on the non-volatile memory 112. Storage of the operating system and most application programs is typically on the bulk storage device 114, although portions of the operating system and/or applications may be copied from the bulk storage device 114 to the volatile memory 110 during operation of the computing device 102 for faster access. One or more of the memory components contain machine-readable instructions adapted to cause the processor 108 to perform methods in accordance with embodiments of the disclosure.

Operating systems for computing devices typically provide access to system counters, which report data about processes being performed by the processor of the computing device during operation. The working set size is a representation of the number of pages that must occupy system memory, e.g., in the volatile memory 110, the non-volatile memory 112 and/or the bulk storage device 114, in order to efficiently operate the currently-active processes of the one or more processors 108. Typically a system memory working set is an aggregation of individual working sets of applications, processes, or tasks running on that computing device. Working set size is commonly available directly as a system counter of the operating system, or is determinable from commonly available system counters of the operating system. If no system counter is available to directly calculate WSS, WSS may be estimated based on system memory activity and resource allocation policies. Because the set of active processes and the demands of individual processes is generally in flux, the working set size is also generally in flux. Hewlett-Packard's HP-UX operating system and Microsoft's WINDOWS operating system are examples of operating systems having system counters capable of determining a working set size of a computing device.

Operating systems for computing devices also typically monitor hardware status information, such as through the Advanced Control and Power Interface (ACPI) specification. Specifications such as ACPI permit operating systems to control configuration and power management of its components. Hewlett-Packard's HP-UX operating system and Microsoft's WINDOWS operating system are examples of operating systems that can utilize the ACPI specification.

The various embodiments may take the form of a computer program resident in system memory, such as a daemon. A daemon is a type of program on Unix-like operating systems that runs unobtrusively in the background, rather than under the direct control of a user, waiting to be activated by the occurrence of a specific event or condition. Such a resident program can make use of the features of the operating system, such as the system counters and ACPI, to cause a processor of a computing device to perform methods in accordance with embodiments of the disclosure.

Figure 2:
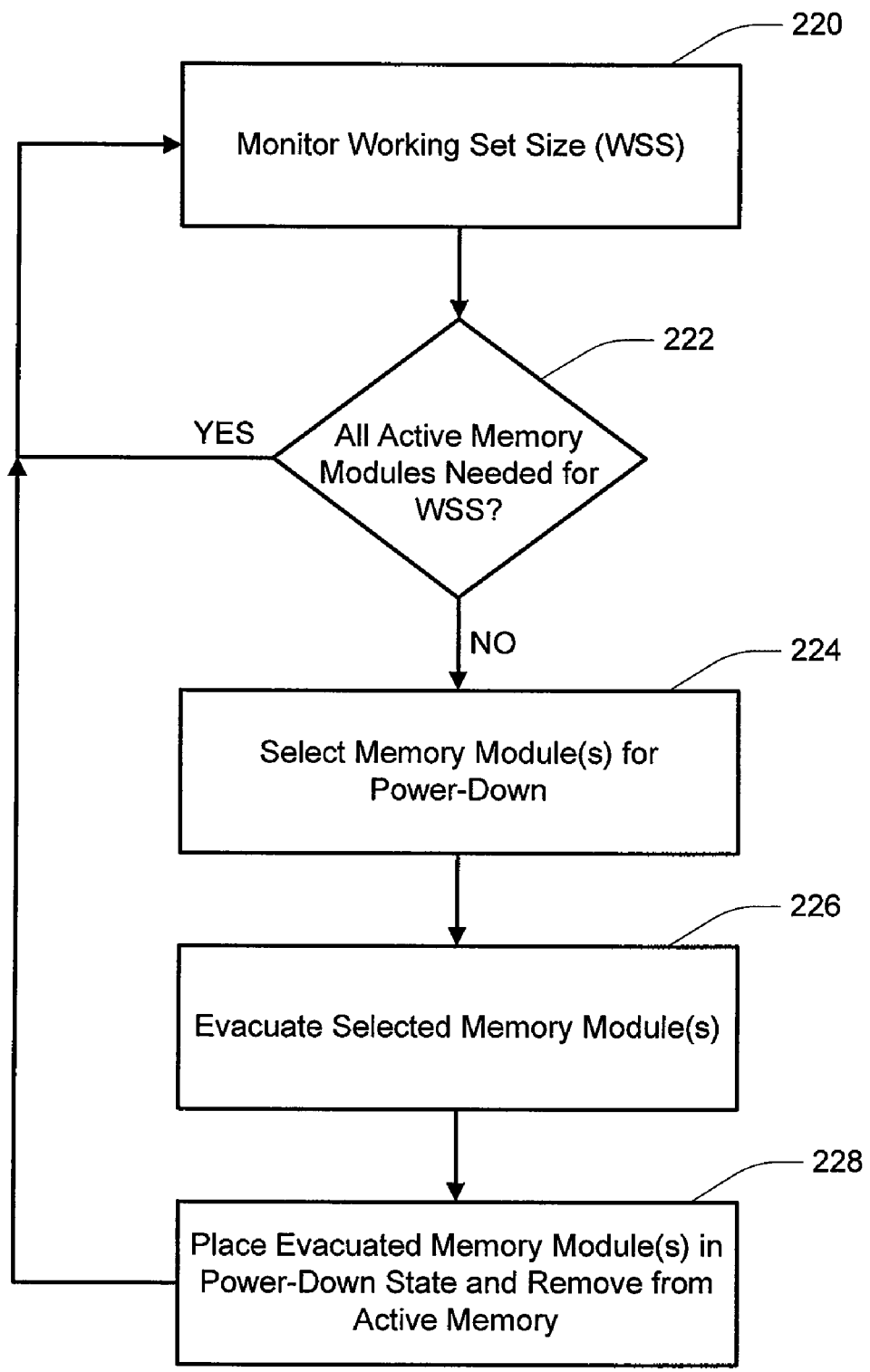
FIG. 2 is a flowchart of a method of managing memory power usage in a computing device in accordance with an embodiment of the disclosure.

FIG. 2 is a flowchart of a method of managing memory power usage in a computing device in accordance with an embodiment of the disclosure. At 220, the working set size (WSS) is monitored. As used herein, the WSS is applicable to the computing device as a whole, and not to any one individual process running on the computing device. As noted above, monitoring the WSS can include monitoring a system counter provided by the operating system running on the computing device. For example, if the operating system provides a counter for the WSS, this counter may be monitored directly. Alternatively, if the operating system provides counters for available memory, working set size of individual processes or any other measurement of how much system memory is actively being used, these one or more counters can be used to determine the WSS of the computing device.

At 222, a determination is made as to whether all active memory modules are needed to contain the WSS. As noted above, the operating system generally knows the status and configuration of its components, such as through the ACPI or similar specification. For example, if a computing device has two 2 GB DIMMs (Dual In-Line Memory Modules) and two 1 GB DIMMs, the operating system would not only be aware that it has 6 GB of available physical memory space, but would also know that its available physical memory space is provided by two 2 GB DIMMs and two 1 GB DIMMs. Thus, if the WSS is 4.6 GB, it could easily be determined that the entire working set of the system could be stored on less than all of the memory modules of the computing device.

For one embodiment, the determination as to whether all active memory modules are needed to contain the WSS is a comparison of the difference between the total active physical memory and the WSS to the size of the smallest memory module. Using the foregoing example, the difference between the total active physical memory (6 GB) and the WSS (4.6 GB) is 1.4 GB. Because 1.4 GB is greater than the smallest memory module, i.e., 1 GB, the WSS would fit on less than all of the active memory modules. In general, it is helpful to maintain consistent units throughout. For example, one might think of the total physical memory, the WSS and the size of the individual memory modules in bytes, pages or any other measure of size. Thus, if the system counters report pages of memory, the memory module sizes might be converted to pages to ease the calculations and comparisons.

If the WSS does not fit on less than all of the active memory modules, the method would proceed back to block 220 to continue monitoring the WSS. However, if the WSS does fit on less than all of the active memory modules, the process would proceed to block 224. The term active memory modules refers to those memory modules that are currently powered up. As memory modules may be powered down later in the method of FIG. 2, any such powered-down memory modules are not included in the active physical memory or active memory modules at block 222.

For some embodiments, the determination of whether the WSS requires all active memory modules includes a threshold value. For example, because memory usage is in flux, it may not be desirable to make a decision when the difference between the available physical memory and the WSS equals the size of the smallest active memory module. Thus, a threshold value can be added to the WSS to delay such a determination such that removal of one memory module would not suddenly force the remaining memory modules to be at full capacity. The threshold value may be some particular percentage of the WSS, e.g., 5%, some particular percentage of a remaining memory module, e.g., 10%, some particular measurement of physical memory, e.g., 20,000 pages, etc. In general, the threshold value represents a cushion of some amount of physical memory expected to remain available after making one or more memory modules unavailable. For embodiments where no such cushion is utilized, the threshold value would be zero. Again, to ease the calculations and comparisons, the threshold value might be expressed in the same units at the total available physical memory, the WSS and the sizes of the individual memory modules.

At 224, one or more memory modules are selected for power-down. For one embodiment, just the smallest active memory module is selected for power-down. For such an example, once a determination is made that the WSS does not need all active memory modules, it is clear that the smallest memory module can be powered down. For another embodiment, the largest active memory module whose size is less than the difference between the total active physical memory and the sum of the WSS and the threshold value is selected for power-down. For such an embodiment, once the difference between the total available physical memory and the sum of the WSS and the threshold value is determined, this value can be compared to the sizes of individual active memory modules, and the largest memory module whose size is smaller than this difference can be selected for power-down. For yet another embodiment, the largest number of active memory modules whose combined size is less than the difference between the total active physical memory and the sum of the WSS and the threshold value is selected for power-down. For such an embodiment, once the difference between the total available physical memory and the sum of the WSS and the threshold value is determined, this value can be compared to the sizes of individual active memory modules, and memory modules starting with the smallest memory module and working up can be selected for power-down until their combined size would no longer remain smaller than this difference.

In order to power down a volatile memory module, its contents need to be copied to another memory module or those contents will be lost when power is removed. Thus, at 226, the selected memory modules are evacuated. The process of evacuation would be similar to page fault processing. A page fault occurs when an access request to a virtual memory address determines that the data corresponding to that virtual address is not contained in the physical memory space, but is contained in the backing store, i.e., the virtual memory address points to a location in the backing store. In response, the system reads the data from the hard drive or other secondary storage area and writes it to the physical address space, updating any links to the virtual memory address to correspond to the new physical location. However, in the evacuation of a memory module for embodiments of the disclosure, the data corresponding to a location in a memory module selected for power-down is moved to a location in another memory module not selected for power-down, with the appropriate update of the links for the corresponding virtual memory address for the relocated data. Removal of virtual address links to the selected memory module effectively marks the data as deleted or obsolete.

Once a memory module has been evacuated at 226, the evacuated memory module is placed in a power-down state at 228 and removed from the active physical memory. Power-down may include the full removal of power to the memory module. Alternatively, power-down may include some intermediate power state. For example, the clock enable (CKE) signal may be removed from the memory module. Removal of the CKE signal removes the access clock, but retains the refresh. Thus, while consuming less power than a fully active memory module, refresh power is still maintained.

Figure 3:
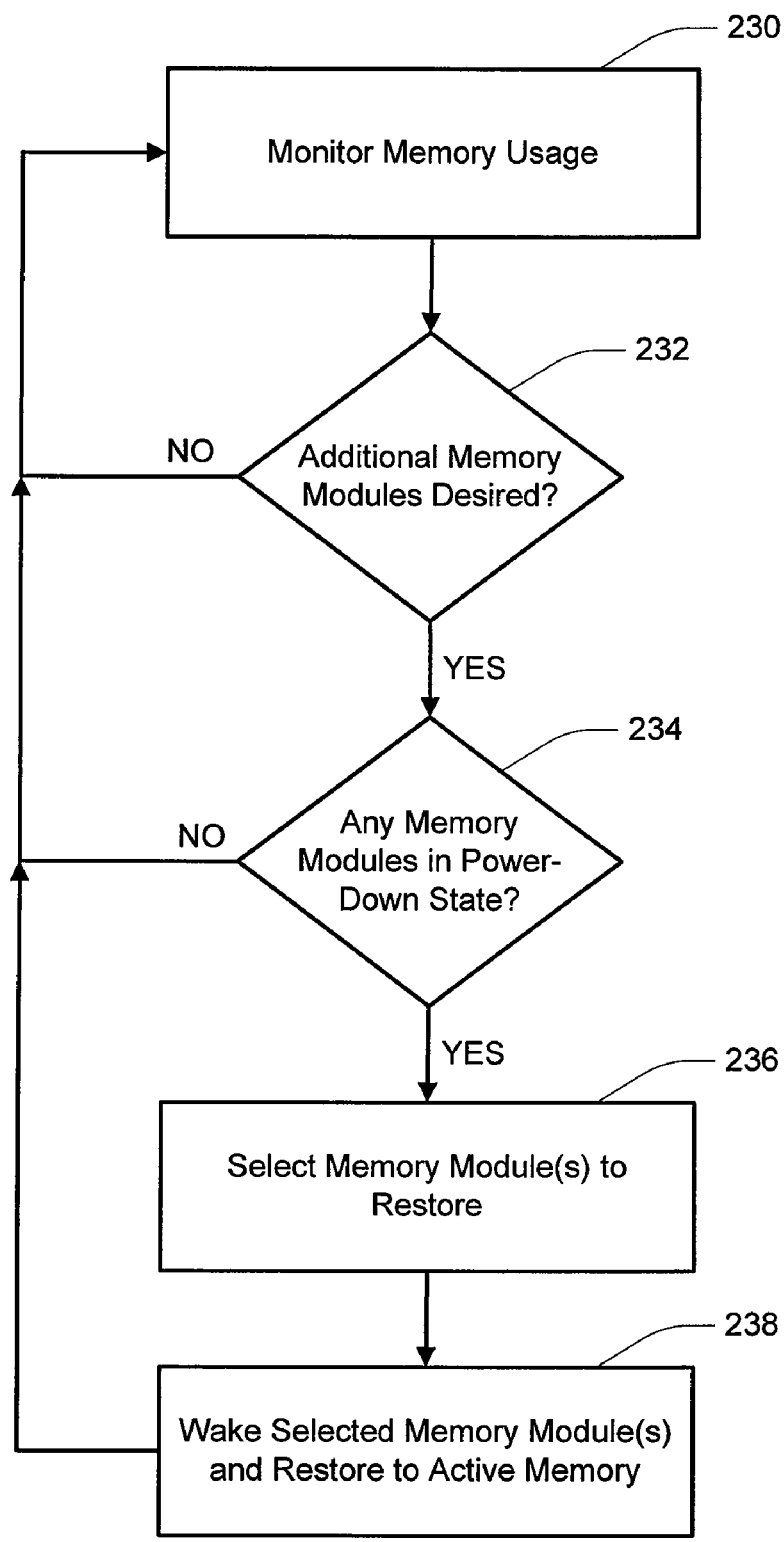
FIG. 3 is a flowchart of a method of managing memory power usage in a computing device in accordance with another embodiment of the disclosure.

FIG. 3 is a flowchart of a method of managing memory power usage in a computing device in accordance with another embodiment of the disclosure. The method of FIG. 3 represents a method of restoring memory modules that have been powered-down in accordance with other embodiments of the disclosure. Thus, embodiments such as that depicted in FIG. 3 will either run in response to the power-down of memory modules, or simply run concurrently with embodiments such as that depicted in FIG. 2.

At 230, system memory usage is monitored. Such monitoring may include monitoring the WSS. Alternatively, such monitoring may include monitoring usage of backing store, such as by monitoring page fault rates. Because page faults occur when requests are made to backing store, increasing rates of page faults are an indication of increasing usage of backing store.

At 232, a determination is made as to whether additional memory modules are desired to handle the WSS. For example, if the WSS is larger than the total available physical memory space, this might be an indication that additional memory modules are desired. However, similar to the determination of whether all available memory modules are required for the WSS, a threshold value may be considered in order to reduce the frequency of powering down and restoring memory modules. For example, the WSS may be allowed to be some particular size larger than the total available physical memory before indicating that additional memory modules are desired. For another embodiment, a desire to add memory modules may be indicated if a page fault rate is greater than some particular value, e.g., 100 pages/minute. Again, this value can be adjusted, with lower values increasing the likelihood of restoring memory modules, and higher values decreasing the likelihood. If no additional memory modules are desired, the method proceeds back to block 230. If a desire for additional memory modules is desired, the method proceeds to block 234.

At 234, a determination is made as to whether there are any powered-down memory modules available to restore. Note that this block can be deleted if the method of FIG. 3 is run only in response to powering down a memory module in accordance with an embodiment of the disclosure, such that block 232 could proceed directly to block 236 if additional memory modules are desired. If no memory modules are powered down at 234, the method would proceed back to block 230. If one or more memory modules are powered down at 234, the method proceeds to block 236.

At 236, one or more powered-down memory modules are selected to restore. For one embodiment, the smallest powered-down memory module is selected. For another embodiment, the selection includes the least number of powered-down memory modules that would be required to support the current WSS and any corresponding threshold value. At 238, the selected memory modules are powered up, or awakened. These memory modules are then restored to the active physical memory.

Figure 4A:
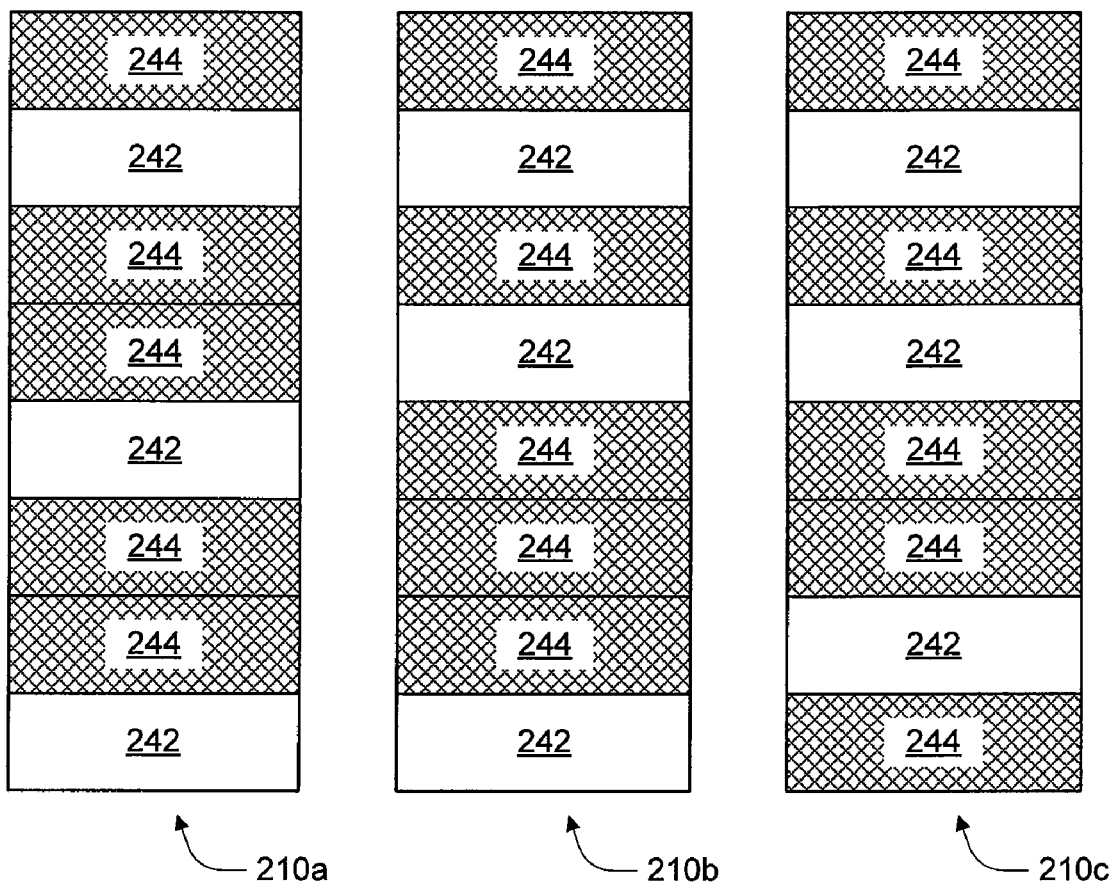
FIGS. 4A-4B provide a representation of evacuation of a memory module in accordance with an embodiment of the disclosure.
Figure 4B:
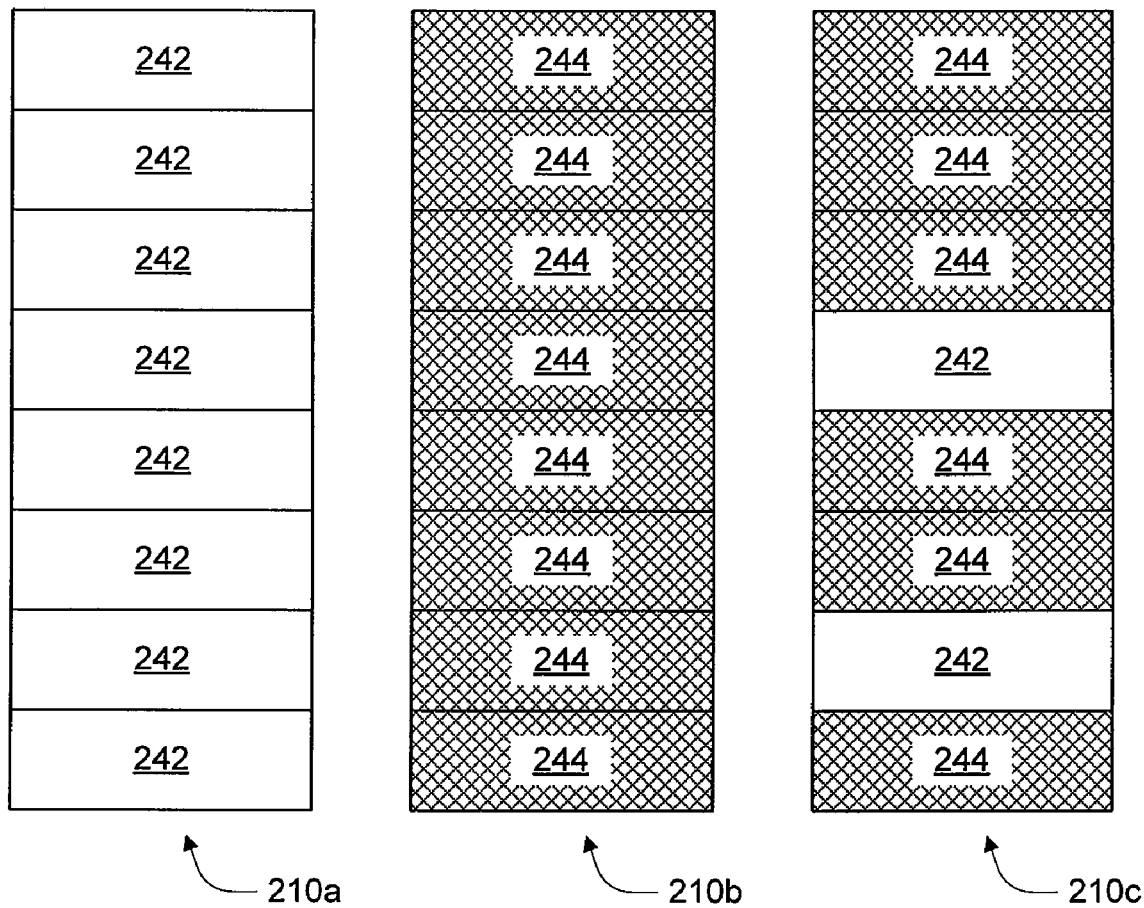

FIGS. 4A-4B provide a representation of evacuation of a memory module in accordance with an embodiment of the disclosure. In FIG. 4A, there are three memory modules 210a/210b/210c depicted. Typical computing devices may have fewer or more memory modules installed. Each memory module 210 has unused memory units 242 and used memory units 244. These memory units are symbolic, and need not correspond to a particular size of a memory module 210. Similarly, although each memory module 210 is shown with the same number of memory units 242/244, the memory modules 210 may be of different sizes. If it is determined that less than all of the memory modules 210a/210b/210c are required for the WSS and any threshold value, at least one would be selected for evacuation. In this example, the WSS can be thought of as the sum of the used memory units 244. Thus, because the used memory units 244 of memory module 210a can be moved into unused memory units 242 of memory modules 210b and 210c, this memory module can be selected for evacuation. In FIG. 4B, the data of the used memory units 244 of memory module 210a are moved to unused memory units 242 of memory modules 210b and 210c, and the virtual address links that had pointed to locations in memory module 210a are moved to point to the new locations in memory modules 210b and 210c, such that all memory units of memory modules 210a and now unused memory units 242. Memory module 210a can then be powered down.

Although specific embodiments have been illustrated and described herein it is manifestly intended that the scope of the claimed subject matter be limited only by the following claims and equivalents thereof.

What is claimed is:

1. A method of managing memory power usage in a computing device having two or more memory modules, comprising:
  monitoring a system working set size of the computing device;
  determining if all active memory modules are needed for the system working set size in response to at least the system working set size, a size of total active physical memory of the active memory modules, and sizes of one or more of the active memory modules;
  if not all active memory modules are needed for the system working set size:
    selecting one or more of the active memory modules for power-down;
    evacuating data from the selected one or more memory modules;

placing the evacuated one or more memory modules in a power-down state; and removing the powered-down memory modules from the active memory of the computing device.

2. The method of claim 1, wherein monitoring the system working set size comprises monitoring one or more system counters of an operating system of the computing device.

3. The method of claim 1, wherein determining if all active memory modules are needed for the system working set size comprises comparing the difference between the size of the total active physical memory of the active memory modules and the system working set size to the size of a smallest active memory module of the computing device.

4. The method of claim 1, wherein determining if all active memory modules are needed for the system working set size comprises adding a threshold value to the system working set size.

5. The method of claim 4, wherein adding a threshold value to the system working set size comprises adding a non-zero threshold value to the system working set size.

6. The method of claim 1, wherein selecting one or more of the active memory modules for power-down comprises selecting a smallest active memory module of the computing device.

7. The method of claim 1, wherein selecting one or more of the active memory modules for power-down comprises selecting a largest number of active memory modules whose combined size is less than a difference between the size of the total active physical memory of the active memory modules and a sum of the system working set size and a threshold value.

8. The method of claim 1, wherein evacuating data from the selected one or more memory modules comprises copying data from the selected one or more memory modules to one or more memory modules of the computing device not selected for power-down.

9. The method of claim 1, wherein placing the evacuated one or more memory modules in a power-down state comprises removing power from the evacuated one or more memory modules.

10. The method of claim 1, further comprising:
monitoring memory usage of the computing device;
determining if additional active memory modules are desired;
selecting one or more powered-down memory modules of the computing device to restore;
waking the selected one or more powered-down memory modules; and
restoring the awakened one or more memory modules to the active memory of the computing device.

11. The method of claim 10, wherein monitoring memory usage of the computing device comprises monitoring the system working set size of the computing device.

12. The method of claim 10, wherein monitoring memory usage of the computing device comprises monitoring a page fault rate of the computing device.

13. The method of claim 10, wherein monitoring memory usage of the computing device is performed in response to placing the evacuated one or more memory modules in a power-down state.

14. The method of claim 10, wherein monitoring memory usage of the computing device is performed concurrently with monitoring a system working set size of the computing device regardless of whether any memory modules of the computing device are in a power-down state.

15. The method of claim 1, wherein monitoring a system working set size of the computing device comprises estimating the system working set size based on memory activity and resource allocation policies of the computing device.

16. A non-transitory computer-usable storage media containing machine-readable instructions adapted to cause a processor to perform a method, the method comprising:
monitoring a system working set size of a computing device containing the processor;
determining if all active memory modules of the computing device are needed for the
system working set size in response to at least the system working set size, a size of total active physical memory of the active memory modules, and sizes of one or more of the active memory modules;
if not all active memory modules of the computing device are needed for the system
working set size:
selecting one or more of the active memory modules for power-down;
evacuating data from the selected one or more memory modules;
placing the evacuated one or more memory modules in a power-down state; and
removing the powered-down memory modules from the active memory of the computing device.

17. The non-transitory computer-usable storage media of claim 16, wherein the method further comprises:
monitoring memory usage of the computing device;
determining if additional active memory modules are desired;
selecting one or more powered-down memory modules of the computing device to restore;
waking the selected one or more powered-down memory modules; and
restoring the awakened one or more memory modules to the active memory of the computing device.

18. The non-transitory computer-usable storage media of claim 17, wherein the machine-readable instructions are adapted to cause a processor to perform monitoring the memory usage of the computing device in response to placing the evacuated one or more memory modules in a power-down state.

19. A computing device, comprising:
a processor;
two or more memory modules in communication with the processor; and
computer-usable storage media containing machine-readable instructions adapted to cause the processor to perform a method, the method comprising:
monitoring a system working set size of the computing device;
determining if all active memory modules of the computing device are needed for the system working set size in response to at least the system working set size, a size of total active physical memory of the active memory modules, and sizes of one or more of the active memory modules;
if not all active memory modules of the computing device are needed for the system working set size:
selecting one or more of the active memory modules for power-down;
evacuating data from the selected one or more memory modules;
placing the evacuated one or more memory modules in a power-down state; and
removing the powered-down memory modules from the active memory of the computing device.

20. The computing device of claim 19, wherein the method further comprises:
- monitoring memory usage of the computing device;
- determining if additional active memory modules are desired;
- selecting one or more powered-down memory modules of the computing device to restore;
- waking the selected one or more powered-down memory modules; and
- restoring the awakened one or more memory modules to the active memory of the computing device.

21. The computing device of claim 20, wherein the monitoring the memory usage of the computing device is performed in response to placing the evacuated one or more memory modules in a power-down state.

* * * * *